United States Patent

Takahashi et al.

[11] Patent Number: 5,813,290
[45] Date of Patent: Sep. 29, 1998

[54] AUTOMATIC TENSION CONTROLLING MECHANISM OF CONTROL CABLE

[75] Inventors: Shigemasa Takahashi; Mitsunari Kato, both of Nagano; Yoshiharu Kitamura, Kanagawa, all of Japan

[73] Assignees: UNI Flex Inc., Nagano; NHK Spring Co., Ltd., Kanagawa, both of Japan

[21] Appl. No.: 832,476

[22] Filed: Apr. 2, 1997

Related U.S. Application Data

[63] Continuation of Ser. No. 351,030, Dec. 7, 1994, abandoned.

[30] Foreign Application Priority Data

Dec. 9, 1993 [JP] Japan .................................. 5-065820

[51] Int. Cl.$^6$ ............................................... F16C 1/10
[52] U.S. Cl. ................................. 74/501.5 R; 74/500.5; 74/502.4; 74/502.6; 192/111 A
[58] Field of Search ............................. 74/500.5–502.6; 192/111 A, 30 W; 188/71.9, 196 B, 72.7, 196 D

[56] References Cited

U.S. PATENT DOCUMENTS

| | | | |
|---|---|---|---|
| 3,756,361 | 9/1973 | Persson et al. | 192/111 A |
| 4,057,135 | 11/1977 | Mori | 192/111 A |
| 4,429,777 | 2/1984 | Taig | 192/111 A |
| 4,651,852 | 3/1987 | Wickham et al. | 192/111 A X |
| 4,690,262 | 9/1987 | Hoyle | 192/111 A |
| 4,735,298 | 4/1988 | Hauguel | 192/111 A |
| 4,756,397 | 7/1988 | Deligny | 192/30 W |
| 4,762,017 | 8/1988 | Jaksic | 74/501 R |
| 4,787,263 | 11/1988 | Jaksic | 74/502.4 X |
| 4,799,400 | 1/1989 | Pickell | 74/502.6 |
| 4,887,705 | 12/1989 | Solano et al. | 192/111 A |
| 4,892,004 | 1/1990 | Segura et al. | 74/501.5 R |
| 5,139,126 | 8/1992 | Perez et al. | 192/111 A |
| 5,249,646 | 10/1993 | Thiel | 188/71.9 |
| 5,265,493 | 11/1993 | Solano et al. | 74/501.5 R |

FOREIGN PATENT DOCUMENTS

| | | | |
|---|---|---|---|
| 0030494 | 6/1981 | European Pat. Off. | 192/111 A |
| 0120616 | 10/1984 | European Pat. Off. | 74/501.5 R |
| 0234864 | 9/1987 | European Pat. Off. | 74/501.5 R |
| 0397008 | 11/1990 | European Pat. Off. | 74/501.5 R |
| 2420164 | 10/1979 | France | 74/501.5 R |
| 1382678 | 3/1988 | U.S.S.R. | 74/501.5 R |
| 2176861 | 1/1987 | United Kingdom | 192/111 A |
| 8300225 | 3/1984 | WIPO | 74/501.5 R |

*Primary Examiner*—Vinh T. Luong
*Attorney, Agent, or Firm*—McAulay Fisher Nissen Goldberg & Kiel, LLP

[57] ABSTRACT

An automatic tension controlling mechanism of a control cable having a tension controlling mechanism. The tension controlling mechanism includes a case through which through a threaded rod of a control cable passes, a split threaded ring composed of plural split parts stored in the case which can be meshed with threaded rod, a spring stored in the case, and a tapered face formed in the case so as to urge the split threaded ring in the direction of meshing with the threaded rod.

1 Claim, 5 Drawing Sheets

AUTOMATIC TENSION CONTROLLING MECHANISM OF CONTROL CABLE

This is a continuation application of 08/351,030 filed Dec. 7, 1994 now abandoned.

BACKGROUND OF THE INVENTION

1. Field of the Invention

The present invention relates to an automatic tension controlling mechanism of a control cable for keeping the freeplay length of a control cable used for an automobile or the like constant.

2. Description of the Related Art

Example of a control cable to be used in an automobile or the like includes, for examples a parking brake cable, an accelerator cable, an automatic transmission cable, a kickdown cable and a clutch cable. When these cables are repeatedly used under tension for a long period of time, these cables are elongated to cause lack of breaking force and lack of working force of an accelerator.

For example when a brake cable to be used for the parking brake device is repeatedly used under tension, the cable are elongated. Particularly, the parking brake cable occurs remarkable extension just after mounting the parking brake device. This extension makes it impossible to maintain the a proper breaking force of the parking break cable.

Accordingly, a mechanism for controlling a length of the parking brake cable have been developed, in which the extension caused in the parking brake cable is absorbed and a stable freeplay length of the cable is obtained.

This kind of conventional mechanism for controlling a length of the cable will be described with reference to FIG. 1. In FIG. 1. there is shown a threaded rod (elongated bolt) coupled with a front cable 2 connected to a parking brake handle (not shown), and a pair of rear cables connected to a break unit (not shown). An equalizer 4 has a rectangular shape (not limited to a rectangular shape). Locking holes 5 are formed at both side end portions of the equalizer 4. Each ends of the rear cables 3 are fitted into the locking holes 5 to be engage therewith by means of terminal stoppers 6. A locking hole 7 is formed in a central portion of the equalizer 4. A center pin 8 is fitted into the locking hole 7 to be engaged therewith.

A through hole 9 penetrating through in a direction at right angle to an axis of the center pin 8 is formed in the center pin 8. The threaded rod 1 is inserted into the through hole 9 so as to pass therethrough and a freeplay length controlling nut (including a lock nut) is screwed into a tip end portion of the threaded rod 1.

The cable length controlling mechanism 11 constituted as described above is mounted between the front cable 2 and the rear cable 3 in which a parking brake handle is connected to a brake unit through the front cable 2 the controlling mechanism 11 and the rear cable 3, and the brake unit is activated by operation of the parking brake handle. When extension or elongation is caused in the front cable and/or the rear cable, it becomes impossible to transmit effectively the working force of the parking brake handle to the brake unit.

When extension is caused in the front cable 2 and the rear cable 3, the tension thereof are manually controlled by tightening a tension controlling nut 10 to obtain desired tension of the front and rear cables 2 and 3.

Accordingly, with the conventional cable length controlling mechanism 11, the tension of the cables 2 and 3 must be manually controlled every time extension is caused in the cables 2 and 3. This causes such problems that it is difficult to control carefully the tension of the cables, and that the manual controlling of the tension requires much time.

SUMMARY OF THE INVENTION

It is an object of the present invention to provide an automatic tension controlling mechanism of a control cable in which a slack of a control cable is automatically taken up to return the control cable to the desired tension state when the slack is occurred in the control cable as described in field of the invention.

It is another object of the present invention to provide a simple, economical and light automatic tension controlling mechanism of a control cable advantageous to a vehicle equipment as an improvement over the various conventional automatic cable length controlling mechanism.

DESCRIPTION OF THE PREFERRED EMBODIMENTS

The present invention will be described in detail based on an embodiment of a parking brake mechanism shown in FIGS. 2 and 3.

Figure 1:
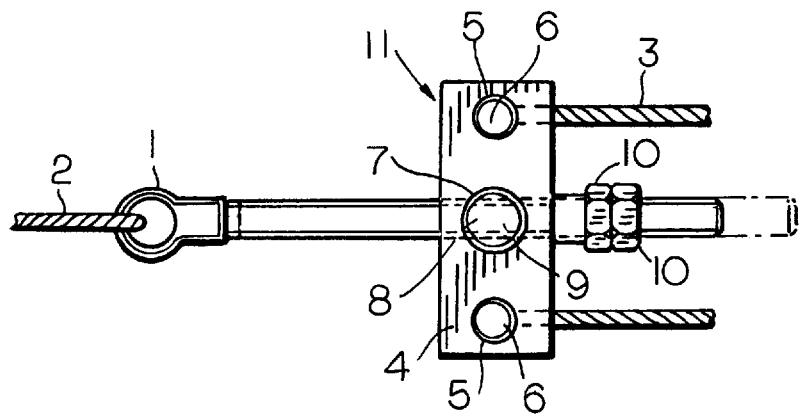
FIG. 1 illustrates a general construction of the conventional cable tension controlling mechanism
Figure 2:
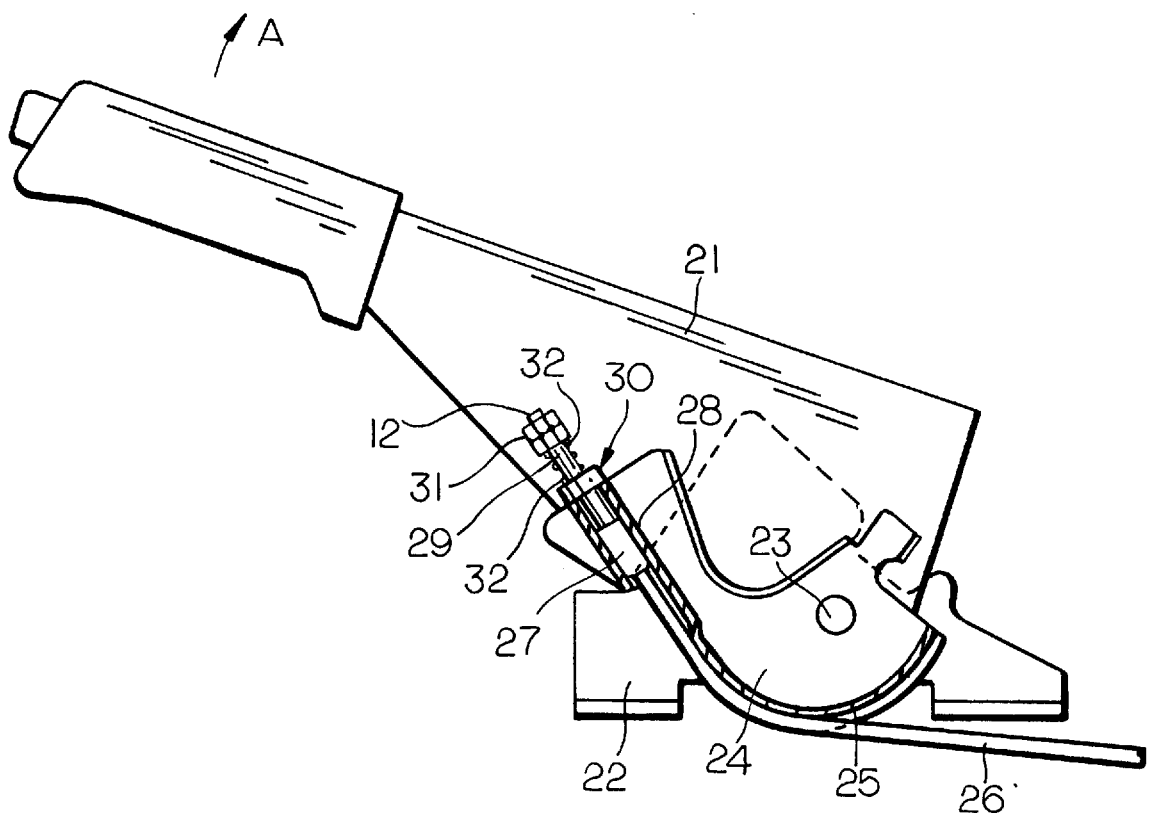
FIG. 2 illustrates a general construction of the cable tension controlling mechanism according to an embodiment of the present invention.

Referring to FIG. 2, a hand brake lever 21 is rotatably supported on a base 22 fixed to a car body by means of a supporting shaft 23.

A circular wheel 24 is formed integrally with a hand brake lever 21, and a circular cable guide groove 25 is formed on a peripheral surface of the wheel 24. The cable guide groove 25 is provided with a guide cylinder 28 for fitting slidably thereinto a connecting shaft 27 combined with one end of a cable 26 (control cable) to be connected to a breaking mechanism (not shown). A threaded rod 29 coaxially extending with the connecting shaft 27 is formed at an edge of the connecting shaft 27. The threaded rod 29 is meshed with a tension controlling mechanism 30, as shown in FIG. 3, and includes a lock nut 31 attached to its tip end 12.

The tension controlling mechanism 30 is resiliently pressed to the end face to the wheel 24 by means of a first spring 32 provided between the tension controlling mechanism 30 and a lock nut 31 meshed with a tip end of the threaded rod 29.

Figure 3:
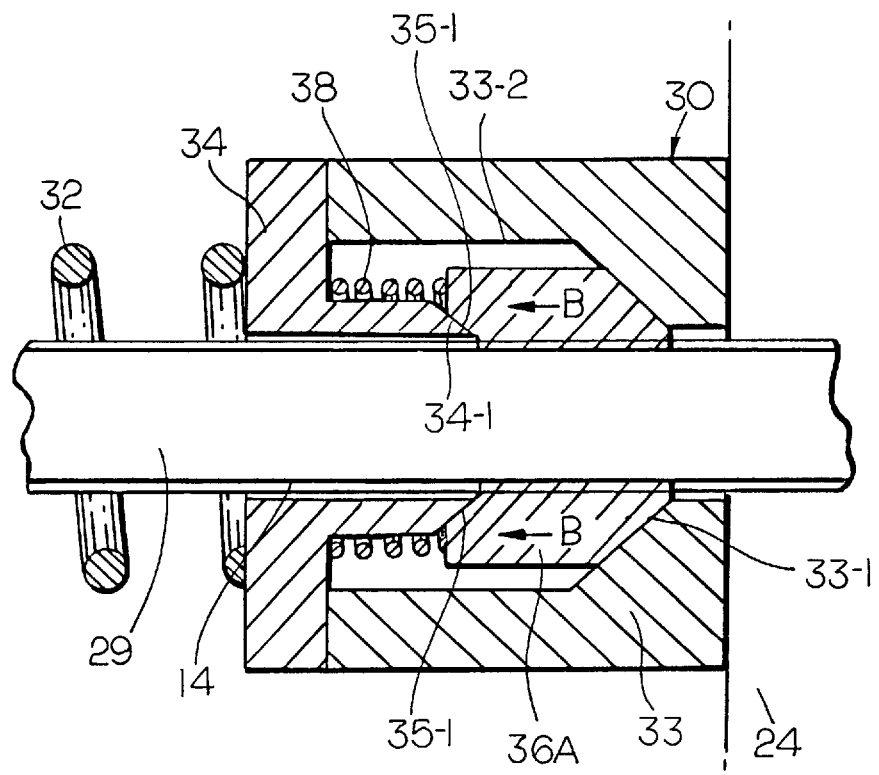
FIG. 3 illustrates a cross section of a tension controlling mechanism alone according to an embodiment of the present invention.
Figure 4:
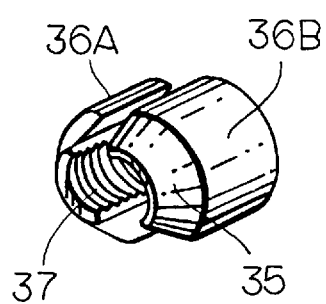
FIG. 4 is a perspective view showing the split threaded rings alone according to an embodiment of the present invention.

As shown in FIG. 3, the tension controlling mechanism 30 includes a case 30 through which the threaded rod 29 passes via an opening 14 placed in a lid 34 for closing the case 33. A threaded ring storage room 33-2 forming a tapered face 33-1 is formed inside of the case 33. A split threaded ring composed of a pair of split sections 36A and 36B having a tapered face corresponding to the tapered face 33-1 is stored in the threaded ring storage room 33-2. Each of the split parts 36A and 36B of the ring has internal threads 37 to be meshed with the threaded rod 29. A second spring 38 is provided between the split threaded rings 36A and 36B and the lid 34 so as to resiliently abut the taper faces 35 of the split threaded ring sections 36A and 36B against the taper face 33-1 of the case 33.

When the hand brake lever 21 shown in FIG. 2 is pulled in the direction of an arrow A, the wheel 24 fixed to the hand brake lever 21 rotates in a clockwise direction. As a result, the brake cable 26 is pulled while being guided by the guide groove 25 of the wheel 24 to work the parking brake.

When the hand brake lever 21 is pulled in the direction opposite to the arrow A to release the parking brake, tension of the cable 26 is released. However, when slack (extension) is caused in the cable 26 upon rotation of the hand brake lever in the direction opposite to the arrow A, the cable 26 is pulled in the tension direction by means of the restoring force of the spring 32, thereby taking up (resolving) the slack in the cable 26.

When the threaded rod 29 is drawn in the direction of the lock nut 31 upon taking up the slack in the cable 26, the split threaded ring sections 36A and 36B meshed with the threaded rod 29 are moved in the direction B against the resilient force of the spring 38. At this time, the female tapered end faces 35-1 formed on the split threaded ring section 36A and 36B is guided by the male tapered end face 34-1 formed on the lid 34 to unmesh the split threaded ring sections 36A and 36B with the threaded rod 29, and the threaded rod 29 slides in the direction of the lock nut 31, thereby taking up the slack in the cable 26.

After the slack in the cable 26 is taken up, the split threaded ring sections 36A and 36B are pressed to move in the direction opposite to B by means of the restoring force of the spring 38, and then come close to each other by means of the contact pressure between the taper face 33-1 of the case 33 and the taper faces 35-1 of the split threaded rings 36A and 36B so as to be meshed with the threaded rod 29. As a result, the tension of the cable 26 is automatically controlled.

In the embodiment as described above, the split threaded ring sections 36A and 36B diametrically divided into two sections are used as one pair. However, the split threaded rings is not limited to this. For example, the split threaded rings radially divided into three sections may be used as one set. Further, an object of the present invention can be also achieved by using split members divided into two sections as described above in which screw threads at the inner periphery of either one of the members are eliminated.

The threaded rod as described above may be formed in the shape of a ratchet, and the threaded rings may be formed into ratchet pawls.

According to this embodiment, when extension is caused in the brake cable 26, a position of mashing a pair of the split threaded ring sections with the threaded rod 29 is automatically changed by means of the action of the tension controlling mechanism 30 during a series of operation of the brake lever as described above to take up the slack in the brake cable 26. Thus, the tension of the cable when returning the hand brake lever is kept constant.

Therefore, according to the automatic tension controller of the parking brake cable of this embodiment the tension of the brake cable when returning the brake lever 21 can be kept constant, thereby preventing the drag of the brake and enhancing safety.

In this embodiment, the tapered faces 35-1 are formed on the split threaded ring sections 36A and 36B and the tapered face 34-1 is formed on the lid 34 as means for opening the slip threaded ring sections 36A and 36B in the opposite direction each other (in the direction of removing from the threaded rod). However, these tapered faces 35-1 and 34-1 may be omitted in accordance with a sectional configuration of the screw threads.

Further, in this embodiment, the tension controlling mechanism 30 is equipped with the hand brake lever. However, the tension controlling mechanism 30 is not limited to this. For example, the tension controlling mechanism 30 may be used for a foot-operating parking pedal or a device near an equalizer system.

In the form of the present invention there is provided an automatic tension controlling mechanism of a control cable, comprising: a hand brake lever supported by a supporting shaft mounted on a base, and formed integrally with a circular wheel guiding an edge of a control cable; a threaded rod connected to the edge of the control cable; a tension controlling mechanism through which the threaded rod being passed; and a spring provided between a lock nut meshed with a tip end of the threaded rod and the tension controlling mechanism to press resiliently the tension controlling mechanism to the circular wheel, wherein the tension controlling mechanism is constituted by; a case passing through which the threaded rod passes; a split threaded rings which are stored in the case and capable of being meshed with the threaded rod; a spring stored in the case; and tapered faces formed in the case so as to urge the split threaded ring in the direction of meshing with the threaded rod by means of the resilient force of the spring. This feature of the invention offers the following advantages. A simple and cheap automatic cable controlling mechanism can be provided, and the automatic controlling of the tension of the cable can be securely performed.

Figure 5:
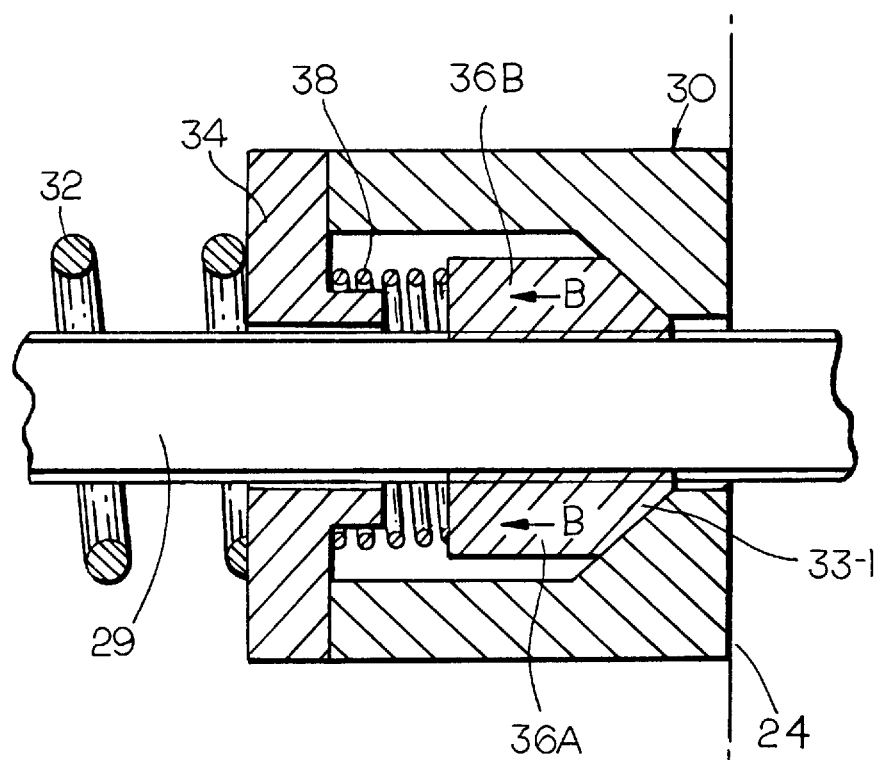
FIG. 5 illustrates a cross-section of a modified embodiment of the present invention.

In FIG. 5, another embodiment of the present invention is shown, in which the threaded split ring sections 36-A and 36-B are tapered only on their one end faces so as to mate with the tapered face 33-1 of the case 33. The other ends of the sections are directly pressed by the spring 38. The desired object and result of the present invention can be achieved by this embodiment.

Figure 6:
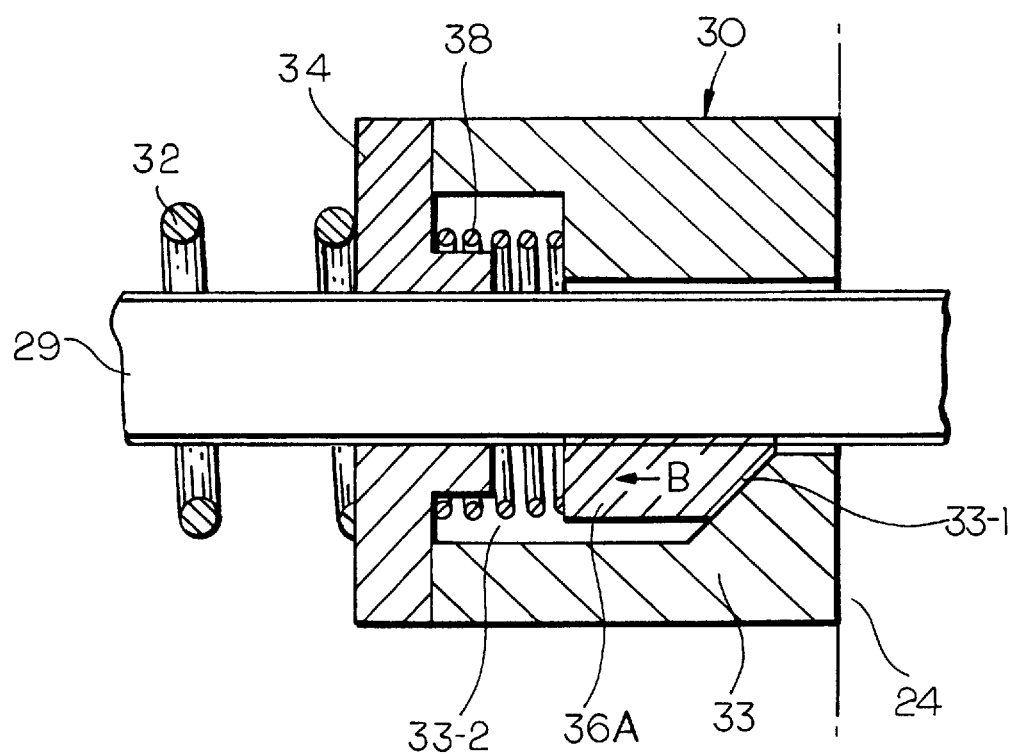
FIG. 6 illustrates a cross-section of another modified embodiment of the present invention.

In FIG. 6, a further modified embodiment of the present invention is shown, in which only one threaded split section of half circle in cross section 36A is used. The section has a tapered end face to mate with the tapered face 33-1 of the case at one end and is pressed by the spring 38 at the other end. The desired object and effect of the present invention can be achieved by this embodiment.

Figure 7:
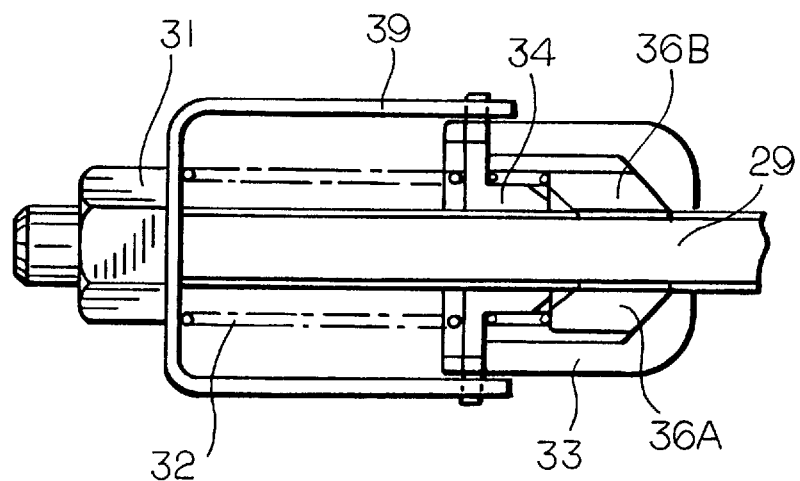
FIG. 7 illustrates a cross-section of a further embodiment of the present invention in which a cover for maintaining a constant compression ratio of the spring pressing the case is used.

FIG. 7 illustrates a modification of the present invention which is advantageous when the mechanism of the present invention is attached to a vehicle. According to this modification, a cover 39 for maintaining the spring 32 at a predetermined compression rate is fitted beforehand. Without this cover, after the mechanism is shown in FIG. 3 is attached to the hand braking system, as shown in FIG. 2, the spring 29 must be adjusted to a predetermined compression rate by the screw nut 31. This adjustment of the compression rate of the spring which must be performed when the mechanism is attached to a vehile is very troublesome and time-consuming.

For eliminating this troublesome and time-consuming adjustment, before the mechanism is attached to a vehicle the cover 39 is fitted to the case with the spring 32 being compressed thereby to a determined compression rate which is decided by the axial length of the cover, and then the mechanism fitted with the cover is attached to the behicle and the threaded rod of a control cable is passed through the case and the cover and fixed by the screw nut.

What is claimed is:

1. An automatic tension controlling mechanism comprising:

a control cable a tension controlling mechanism through which a threaded rod of the control cable passes a first spring provided between a lock nut meshed with a tip end of said threaded rod and said tension controlling mechanism to press resiliently said tension controlling mechanism, where said first spring automatically absorbs a foreseeable slack of the control cable and maintains the cable in a desired state of tension, wherein said tension controlling mechanism comprises:

a case through which threaded rod passes;

a split threaded ring which is stored in said case and capable of being meshed with said threaded rod;

a second spring stored in said case for pressing the split threaded ring in a direction which is parallel to an outer surface of threaded rod; and a tapered face formed in said case, which opposes a resilient force produced by said second spring and urges said split threaded ring in the direction of meshing with said threaded rod by means of the resilient force of said second spring;

wherein the case is provided with a lid having an opening to let the threaded rod to pass therethrough, where the lid has a male tapered end face and the split thread ring has a female tapered end face to mesh with the male tapered end face of the lid.

\* \* \* \* \*